United States Patent
Spiridon et al.

(10) Patent No.: US 7,305,052 B2
(45) Date of Patent: Dec. 4, 2007

(54) UWB COMMUNICATION RECEIVER FEEDBACK LOOP

(75) Inventors: Alex Spiridon, Palo Alto, CA (US); Dave Benzel, Livermore, CA (US); Farid U. Dowla, Castro Valley, CA (US); Faranak Nekoogar, San Ramon, CA (US); Erwin T. Rosenbury, Castro Valley, CA (US)

(73) Assignee: The Regents of the University of California, Oakland, CA (US)

( * ) Notice: Subject to any disclaimer, the term of this patent is extended or adjusted under 35 U.S.C. 154(b) by 716 days.

(21) Appl. No.: 10/815,450

(22) Filed: Mar. 31, 2004

(65) Prior Publication Data

US 2004/0242155 A1    Dec. 2, 2004

Related U.S. Application Data

(60) Provisional application No. 60/474,150, filed on May 28, 2003.

(51) Int. Cl.
| | |
|---|---|
| *H04L 27/08* | (2006.01) |
| *H04L 27/00* | (2006.01) |
| *H04B 1/00* | (2006.01) |
| *H04B 7/165* | (2006.01) |
| *H01Q 11/12* | (2006.01) |

(52) U.S. Cl. ............... 375/345; 375/147; 375/259; 455/23; 455/118

(58) Field of Classification Search ............... 375/259, 375/147; 455/23, 118
See application file for complete search history.

(56) References Cited

U.S. PATENT DOCUMENTS

| | | | |
|---|---|---|---|
| 5,995,566 A | 11/1999 | Rickard et al. | |
| 6,067,333 A * | 5/2000 | Kim et al. | 375/346 |
| 6,289,004 B1 | 9/2001 | Mesecher | |
| 6,529,563 B1 * | 3/2003 | Mosinskis et al. | 375/317 |
| 2001/0053175 A1 | 12/2001 | Hoctor et al. | |
| 2002/0064245 A1 | 5/2002 | McCorkle | |
| 2002/0106040 A1 | 8/2002 | Malkemes et al. | |
| 2002/0186764 A1 | 12/2002 | Amin et al. | |
| 2003/0053526 A1 * | 3/2003 | Reznik | 375/148 |
| 2003/0161386 A1 * | 8/2003 | Schilling | 375/141 |
| 2003/0198212 A1 | 10/2003 | Hoctor et al. | |
| 2004/0196892 A1 * | 10/2004 | Reznik | 375/148 |
| 2005/0180364 A1 * | 8/2005 | Nagarajan et al. | 370/335 |

FOREIGN PATENT DOCUMENTS

EP      0701334 A2      3/1996

* cited by examiner

*Primary Examiner*—Mohammed Ghayour
*Assistant Examiner*—Nurul M Matin
(74) *Attorney, Agent, or Firm*—Michael C. Staggs; John H. Lee

(57) ABSTRACT

A novel technique and structure that maximizes the extraction of information from reference pulses for UWB-TR receivers is introduced. The scheme efficiently processes an incoming signal to suppress different types of UWB as well as non-UWB interference prior to signal detection. Such a method and system adds a feedback loop mechanism to enhance the signal-to-noise ratio of reference pulses in a conventional TR receiver. Moreover, sampling the second order statistical function such as, for example, the autocorrelation function (ACF) of the received signal and matching it to the ACF samples of the original pulses for each transmitted bit provides a more robust UWB communications method and system in the presence of channel distortions.

39 Claims, 7 Drawing Sheets

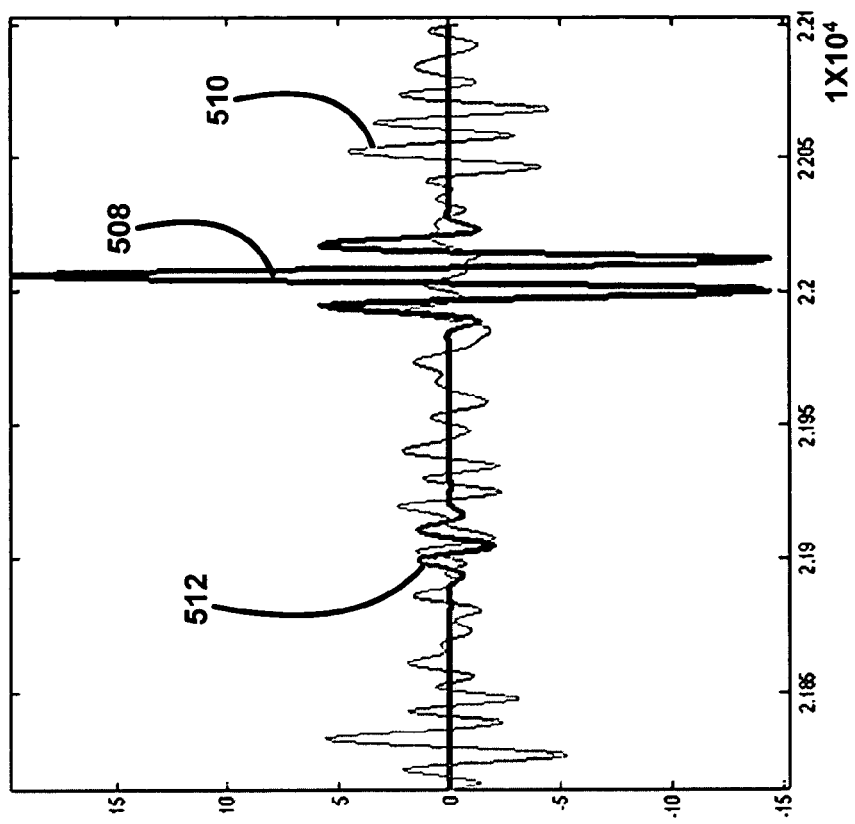
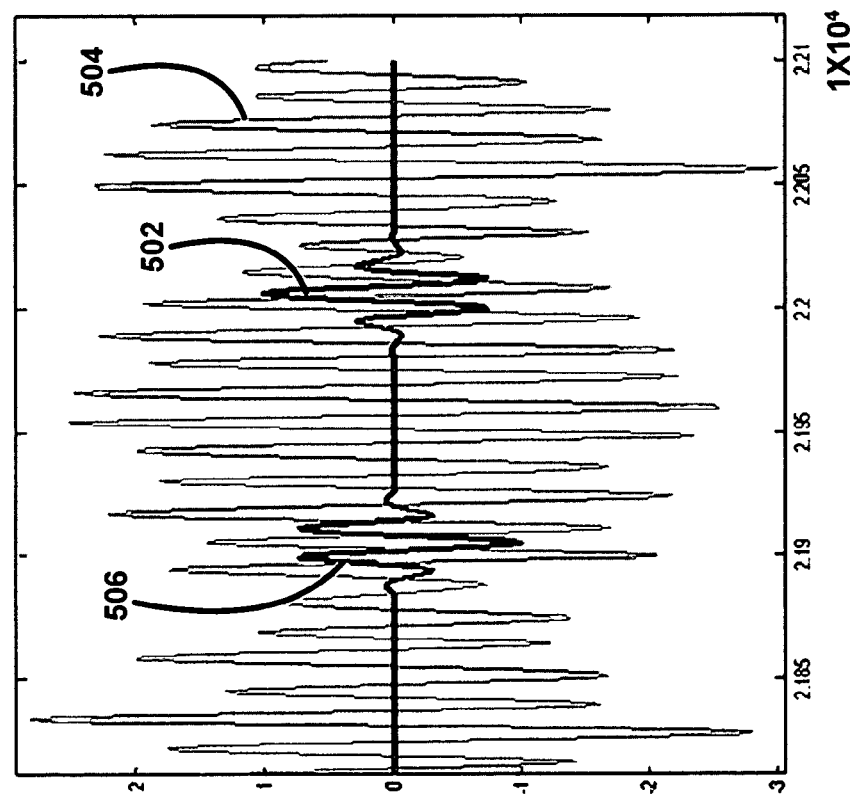

UWB COMMUNICATION RECEIVER FEEDBACK LOOP

RELATED APPLICATION

This application claims the benefit of U.S. Provisional Application No. 60/474,150, filed May 28, 2003, and entitled, "Impulse Communications", which is incorporated herein by this reference.

The United States Government has rights in this invention pursuant to Contract No. W-7405-ENG-48 between the United States Department of Energy and the University of California for the operation of Lawrence Livermore National Laboratory.

BACKGROUND OF THE INVENTION

1. Field of the Invention

The present invention relates to a communication method, apparatus and system, and more particularly to an ultra wide-band (UWB) communication apparatus, system and method employing a delay loop to suppress various types of channel noise, such as, additive white Gaussian noise (AWGN) or narrowband interference (NBI) on the transmitted signal.

2. Description of Related Art

Ultra-wideband (UWB) technology provides the potential for delivering a large amount of data with low power spectral density due to modulation of extremely narrow pulses. The short duration of UWB pulses spreads their energy across a wide range of frequencies from near DC to several GHz and enables UWB signals to share the frequency spectrum with the coexisting narrowband and wideband communication systems. Although UWB communications offer a promising solution to an increasingly overcrowded frequency spectrum, the overlay of UWB signals on coexisting narrowband systems can impart interference, i.e., noise, for both UWB and narrowband systems. Studies show that UWB systems are not considered a serious threat to most narrowband systems due to their low power spectral densities. However, strong interference from narrowband systems on UWB devices can be detrimental to low powered UWB waveforms and is not to be overlooked. Therefore, proper interference mitigation techniques to enhance data extraction are deemed beneficial to a successful UWB receiver design.

A UWB receiver design that utilizes transmitted reference (TR) pulses is described in U.S. Patent No. 2001/0053175, entitled "Ultra-Wideband Communications System," to Hoctor et al., patented Dec. 20, 2001, including the following: "the present invention consists of the combination of two chief features and innovation surrounding each of them. The first of these is known in the art as transmitted-reference (TR). The TR technique is defined as the transmission of two versions of a wideband carrier, one modulated by data and the other unmodulated. The second feature of the present invention is a type of multiple access scheme called 'delay hopping'. The term 'delay hopping' refers to a multiple access technique that is related to delay modulation in the way that 'frequency hopping' is related to frequency modulation. Our new system has high immunity to narrow-band interference by virtue of both the delay-hopping (DH) feature and the use of more than two pulses in the TR transmission."

Conventional ultra wideband TR receivers perform poorly in low-signal-to-noise-ratio environments due to an increase in the received signal's noise-on-noise component introduced by various types of channel noise, such as, AWGN or narrowband interference (NBI) on the transmitted signal. Therefore, such receivers are essentially ineffective for covert, low probability of intercept and detection (LPI/D) communication systems where low power UWB signals have to overcome the effect of intentional and non-intentional jamming by narrowband signals. Moreover, since conventional TR receivers use the same pulse shape for several users in a multiple access channel, the correlation between similar pulses increases the multiple access interference (MAI) as the number of users increases.

Accordingly, a need exists for an ultra wideband communication method and system that can suppress various types of UWB and non-UWB interference prior to signal detection in a multiple access communications format.

SUMMARY OF THE INVENTION

The present invention is directed to an ultra-wideband (UWB) receiver, system, and method that utilizes a feedback loop mechanism to enhance the signal-to-noise ratio of reference pulses in a conventional TR receiver.

Another aspect of the present invention is directed to an ultra-wideband (UWB) receiver that utilizes a feedback loop mechanism to enhance the signal-to-noise ratio of reference pulses in addition to correlating and multi-sampling received pulses over values indicative of a second order statistical function from received transmitted pulse pairs.

Another aspect of the present invention is directed to an ultra-wideband (UWB) receiver that utilizes a feedback loop mechanism to enhance the signal-to-noise ratio of reference pulses in addition to correlating and multi-sampling received pulses over values indicative of the autocorrelation function from received transmitted pulse pairs.

Another aspect of the present invention is directed to an ultra-wideband (UWB) system that utilizes a feedback loop mechanism to enhance the signal-to-noise ratio of reference pulses in addition to correlating and multi-sampling received pulses over values indicative of the autocorrelation function to determine an output signal that indicates encoded information.

Another aspect of the present invention is directed to an ultra-wideband (UWB) method that includes: receiving one or more UWB transmitted pulse pairs, each of the transmitted pulse pairs separated by a predetermined lag interval D, wherein one or more received pulse pairs have a predetermined encoded data and a predetermined symbol repetition rate; feedback looping one or more times, a predetermined portion of the one or more received UWB pulse pairs, wherein the pulse pairs are shifted by the symbol repetition period with each iteration through a feedback loop; delaying a predetermined portion of the received one or more UWB pulse pairs, by the lag interval D; multiplying and integrating one or more reference signals produced by the looped pulse pairs with one or more delayed versions of encoded data included in the delayed one or more pulse pairs to generate a total energy that decodes the one or more received pulse pairs; and outputting bit information indicative of encoded information of the received pulse pairs.

A final aspect of the present invention is directed to an ultra-wideband (UWB) method of receiving one or more UWB transmitted pulse pairs, each of the transmitted pulse pairs separated by a predetermined primary lag interval $D_n$, wherein one or more received pulse pairs have a predetermined encoded data and a predetermined symbol repetition rate; feedback looping one or more times, a predetermined portion of the one or more received UWB pulse pairs, wherein the received one or more pulse pairs are shifted by the symbol repetition period with each iteration through a feedback loop; delaying a predetermined portion of the received one or more UWB pulse pairs, by the primary lag interval $D_n$; multiplying and integrating the primary and secondary delayed pulses with a predetermined looped received reference pulse to generate a plurality of values indicative of the autocorrelation function of the received pulse pairs; matching a plurality of stored sampled values indicative of the autocorrelation function of the transmitted pulse pairs with the generated plurality of values indicative of the autocorrelation function of the received pulse pairs; and outputting bit information based on the matched sampled values indicative of the autocorrelation function of the transmitted pulse pairs that indicates encoded information of the transmitted pulse pairs.

Accordingly, the present invention provides a desired UWB system and method capable of delivering a large amount of data with a low power spectral density by suppressing AWGN and NBI as well as MAI. Such a system is more robust and has an increased signal to noise coupled with added security for multiple users to communicate in a covert communication system for military applications, such as wireless sensor networks in a tactical battle field.

BRIEF DESCRIPTION OF THE DRAWINGS

The accompanying drawings, which are incorporated into and form a part of the disclosure, illustrate an embodiment of the invention and, together with the description, serve to describe the invention.

FIG. 5(a) shows a TR doublet in a transmission channel that includes AWGN and NBI.

FIG. 5(b) shows "Ref" pulse cleaning in a transmission channel that includes AWGN and NBI.

DETAILED DESCRIPTION OF THE INVENTION

Figure 1:
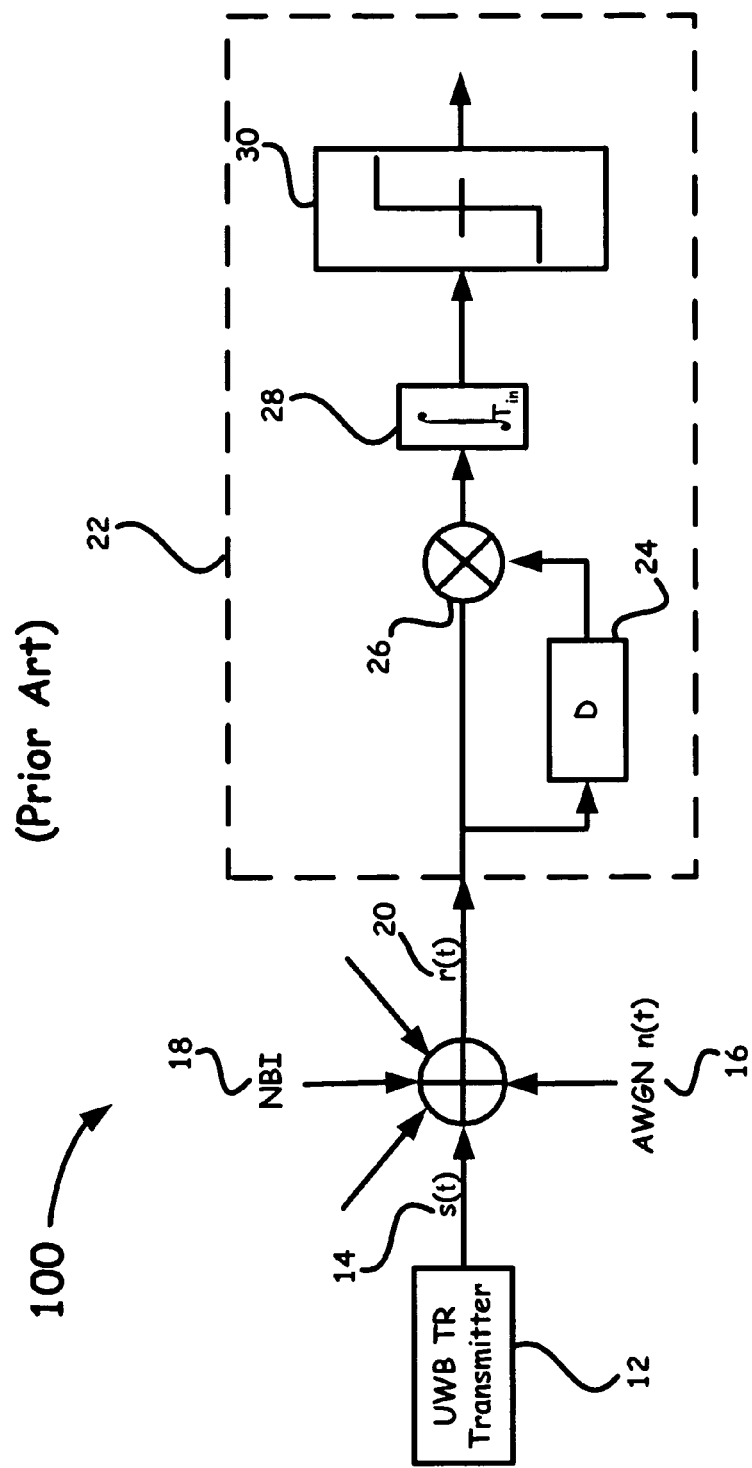
FIG. 1 is a general block diagram of a conventional UWB-TR receiver in the presence of AWGN and multiple narrowband interferers.

Referring now to the drawings, specific embodiments of the invention are shown. The detailed description of the specific embodiments, together with the general description of the invention, serves to explain the principles of the invention.

Unless otherwise indicated, all numbers expressing quantities of ingredients, constituents, reaction conditions and so forth used in the specification and claims are to be understood as being modified in all instances by the term "about". Accordingly, unless indicated to the contrary, the numerical parameters set forth in the specification and attached claims are approximations that may vary depending upon the desired properties sought to be obtained by the subject matter presented herein. At the very least, and not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the subject matter presented herein are approximations, the numerical values set forth in the specific examples are reported as precisely as possible. Any numerical value, however, inherently contain certain errors necessarily resulting from the standard deviation found in their respective testing measurements.

General Description

Due to overlay of UWB and narrowband signals in a frequency spectrum, the presence of narrowband interference in UWB communication systems is often an unavoidable problem. Narrowband interferers may have less energy than the UWB signal, but since their energy is concentrated over a narrow bandwidth, they can mask low power UWB signals. Although UWB communication systems have high processing gain that can provide an inherent immunity to narrowband interference, their performance can suffer considerably in the presence of strong Narrow Band Interferers (NBIs). Therefore, applying additional interference suppression techniques are beneficial in a successful UWB receiver design.

The present invention thus provides a UWB communications TR receiver that can operate in the presence of additive white Gaussian noise (AWGN) and interference from coexisting narrowband wireless systems by utilizing a feedback loop so as to suppress such noise and improve the bit-error-rate performance of the receiver and system disclosed herein.

Moreover, the present invention can be arranged to additionally utilize a multiple pulse multiple delay (MPMD) method and receiver design, which incorporates orthogonal TR modulated chirp pulses for UWB channelization. Such a multiple pulse multiple delay (MPMD) method uses time delays to separate the channels, which can be as small as about a fraction of the pulse duration, e.g., down to about a picosecond, for each user to produce the improved BERs, i.e., the percentage of bits that have errors relative to the total number of bits received in the transmission. A similar MPMD structure and method thereof is disclosed in incorporated by reference co-pending U.S. application Ser. No. 60/462507, titled "Multi-pulse Multi-delay (MPMD) Multiple Access Modulation for UWB" by Dowla et al., the disclosure of which is herein incorporated by reference in its entirety.

MPMD method uses orthogonal chirp pulses to modulate transmitted data. The chirp pulses are typically generated by conventional techniques, such as, voltage controlled oscillators (VCO). The pulses are just a sequence of impulses; there is no carrier. There is no specific frequency associated with this technique; rather, its frequency spectrum is related by, for example, the Fourier transform of the pulse. The free-space radiated pulse may have a pulse-width of about 5 ns or less, often about 1 ns or less, and more often about 200 picoseconds wide with average power levels of up to about 5 mW. In addition, other pulse shapes that provide orthogonality and decrease MAI and increase channel capacity, such as, for example, a wavelet based waveform, (i.e., a functional waveform that satisfies certain mathematical requirements to represent other functions), or a Hermite based waveform may also be employed.

A symbol in the present invention is represented by a pair of pulses (unique to each user) called a reference ("Ref") pulse and Data, i.e., "Tr" pulse separated by a unique delay for each user. An exemplary UWB receiver of the present invention can suppress interference for reference pulses in a TR receiver as disclosed herein, by introducing a feedback loop with a delay equal to a symbol repetition period (SRP) as applied to a conventional TR receiver. In addition, such a feedback loop can be arranged in a receiver design that can sample the receiver autocorrelation function (ACF) at both zero and non-zero lags, thus also providing a multi-sampling method that matches the shape of the received ACFs rather than just the shape of the received pulses. Such a multi-sampling, i.e., sampling zero and non-zero ACF lags, is another beneficial approach when utilizing UWB pulses because of channel distortions, such as, noise, fading and multipath effects, (i.e., effects that result from the destructive interference caused by the sum of several received paths that may be out of phase with each other), which can make pulse detection difficult because the pulse shape at the receiver is typically different compared to the transmitted pulse shape. However, autocorrelation functions of these pulses preserve their shape at the receiver despite the deleterious effects of such channel distortions.

The present invention thus combines a feedback loop method and system, orthogonal pulse shape coding, to conventional TR receivers to suppress narrow band interferers (NBI) and additive white Gaussian noise (AWGN), improve bit error rate (BER) performance, reduce MAI, and increase channel capacity.

Specific Description

Turning now to the drawings, FIG. 1 shows a conventional UWB-TR transceiver, generally designated as reference numeral 100, which includes an UWB TR transmitter 12 configured to output UWB signal(s), (s)t 14, in the presence of AWGN n(t) 16 and interference from coexisting narrowband wireless systems, i.e., NBI 18. A conventional TR UWB receiver 22 (as shown by the dashed box) as part of transceiver 100, is shown configured to receive signals (shown as (r)t 20) from UWB TR transmitter 12 and such a receiver 22 includes a delay 24, denoted as D, split off a main line of the received signal (r)t 20 that includes transmitted pulse pairs from transmitter 12. Also include in conventional receiver 22 is a multiplier 26 for multiplying the delayed and non-delayed versions of transmitted pulse pairs encompassed within received signal (r)t 20, an integrator 28, and a hard decision block 30 that can output bit information of the encoded data. Received signal (r)t 20 often includes UWB signal (s)t 14, coupled with cumulative NBI 22 and AWGN n(t) 16. The cumulative NBI 22 from K narrowband interferers, having different carrier frequencies, $$\sum_{k=1}^{K} m_k(t),$$

with AWGN n(t) 16 and UWB signal (s)t 14, as follows:

$$r(t) = s(t) + \sum_{k=1}^{K} m_k(t) + n(t) \quad (1)(a)$$

The sinusoidal NBI 22 can be expressed in a simple form as:

$$m_k(t) = M_k \cdot \sin(\omega_k t)(k=1, \ldots, K); \quad (1)(b)$$

where $\omega = 2\pi f_k$.

The dominant component of interference caused by AWGN to TR receivers in low SNR channels is identified as noise-on-noise interference ($I_{nn}$) defined by:

$$I_{nn}(AWGN) = \int_{T_{in}} n(t) \cdot n(t-D) dt$$

with it's variance calculated as:

$$E\{I_{nn}^2(AWGN)\} = E\left\{\left[\int_{T_{in}} n(t) \cdot n(t-D) dt\right]^2\right\} = \frac{T_{in} \cdot B \cdot N_0^2}{2}. \quad (3)$$

Where $T_{in}$ represents the finite integration period, B is the transmission bandwidth, and $N_0/2$ corresponds to the variance of AWGN. When NBI is added to a transmitted signal, the value of $I_{nn}$ at the output of integrator in a TR receiver can be calculated as shown by equations 4 and 5:

$$I_{nn}(NBI) = \int_{T_{in}} \sum_{k=1}^{K} M_k \cdot \sin(\omega_k t) \cdot \sum_{j=1}^{K} M_j \cdot \sin(\omega_j(t-D)) dt \quad (4)$$

$$I_{nn}(NBI) = \quad (5)$$
$$\int_{T_{in}} \sum_{k=1}^{K} \sum_{j=1}^{K} \frac{M_k M_j}{2} \cos((\omega_k + \omega_j)t - \omega_j D) \cdot \cos((\omega_k - \omega_j)t + \omega_j D) dt$$

An integrator as shown by equation (5), represents a low-pass filter, thus the low frequency sinusoids, $\sin((\omega_k - \omega_j)t)$, and constant terms, $\omega_j D$, from the second sinusoidal term in (5) add up and can cause significant distortion to a received signal. The variance of such interference in a simple form of one interferer is given by:

$$E\{I_{nn}^2(NBI)\} = \quad (6)$$
$$E\left\{\left[\int_{T_{in}} M^2 \cdot \sin(\omega t) \cdot \sin(\omega(t-D)) dt\right]^2\right\} = \frac{1}{4} M^4 T_{in}^2 \cos^2(\omega D)$$

Figure 2:
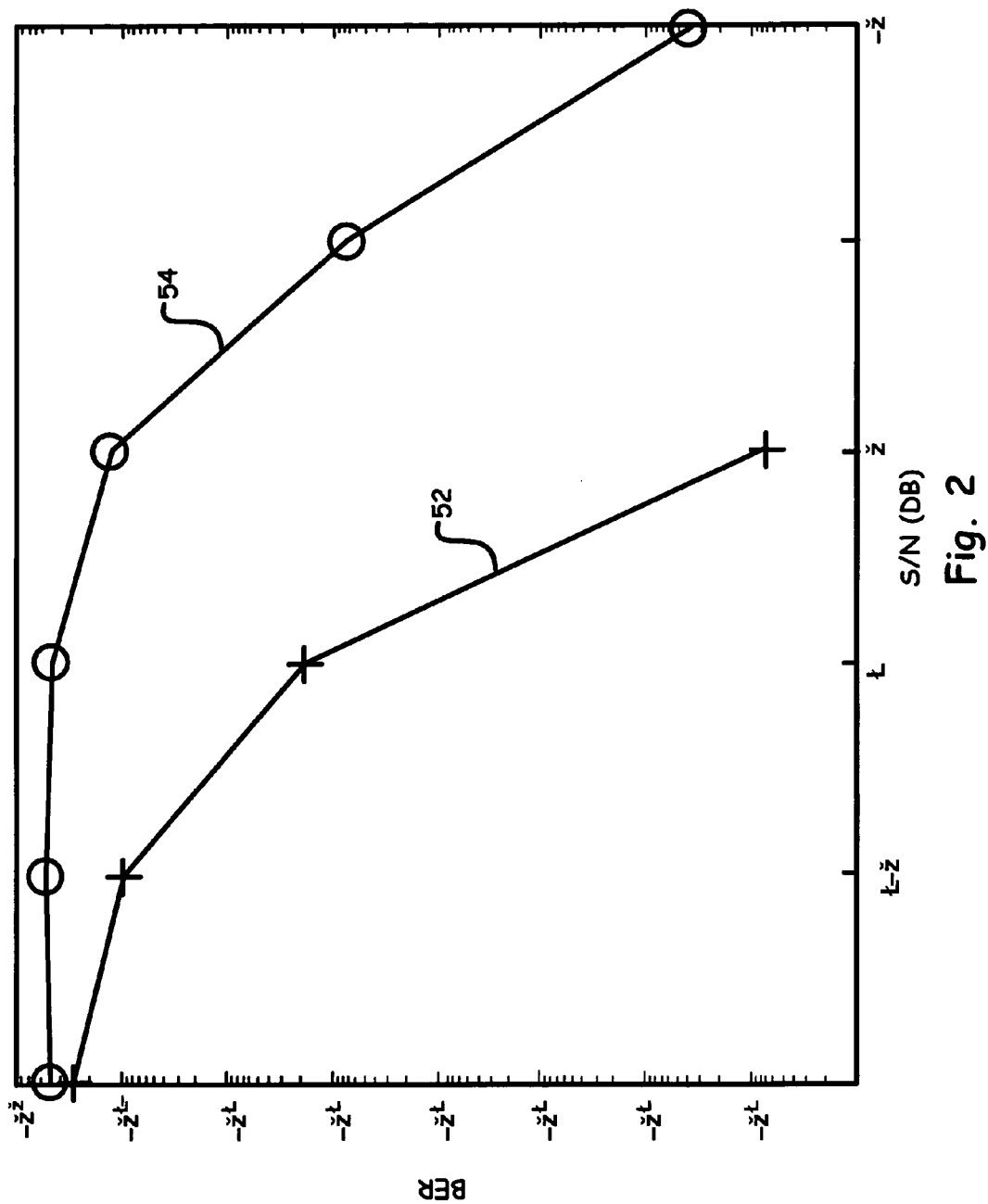
FIG. 2 shows the performance degradation of a conventional TR receiver in an AWGN only channel compared against a transmission channel that includes AWGN in addition to NBI.

FIG. 2 shows the performance degradation of a conventional TR receiver, as shown in FIG. 1, in an AWGN only channel 52 (shown as plus symbols) compared against a transmission channel that includes AWGN in addition to NBI 54 (shown as circles) from multiple interferers. The x-axis shows the Signal to Noise Ratio (SNR) in decibels (dB) that is an indication of the ratio of signal power to noise power and the y-axis is the BER. As shown in FIG. 2, the performance of a TR receiver in the presence of narrowband interferers 54 is about two orders of magnitude worse than its performance in an AWGN only channel 52.

Figure 3:
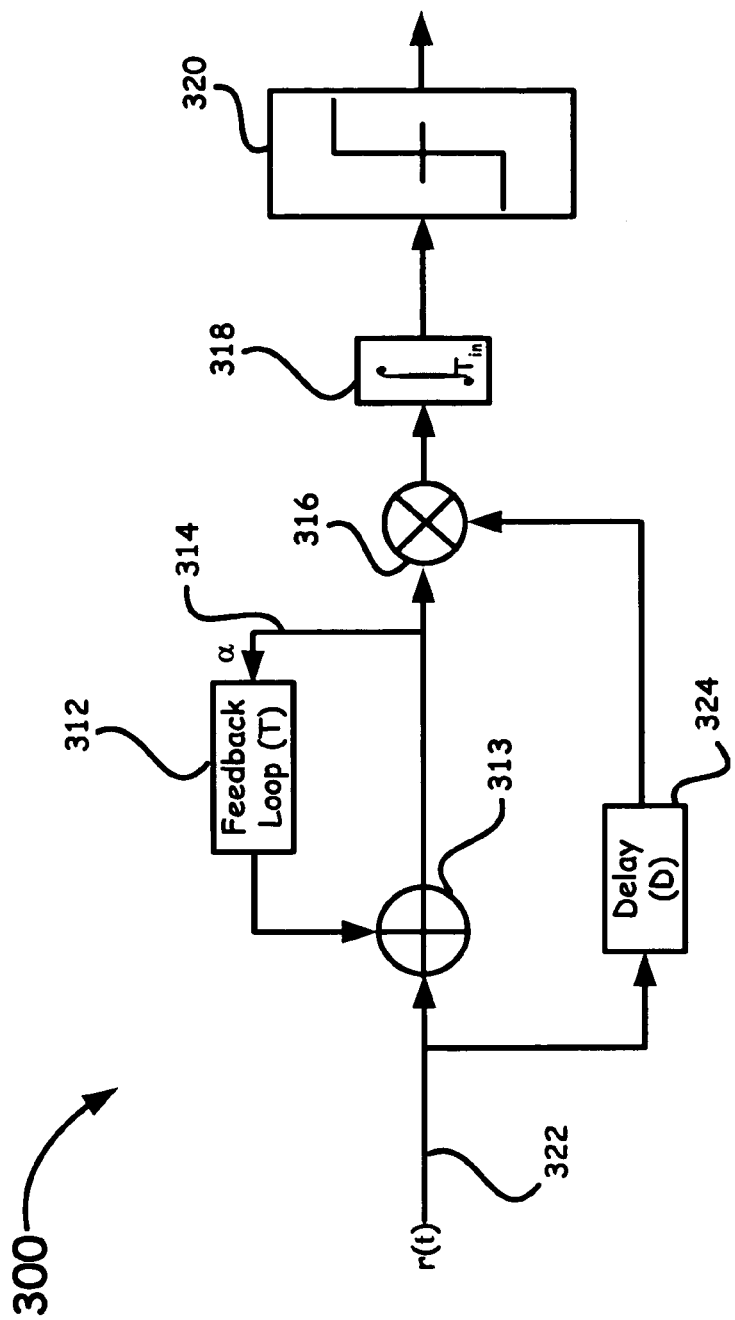
FIG. 3 shows a modified TR receiver block diagram utilizing a feed back loop for non-UWB interference mitigation.

FIG. 3 shows a receiver block diagram, generally designated as reference numeral 300, of a novel receiver method of actively suppressing interference in TR receivers while preserving a desired UWB signal. In such a novel example embodiment, interference suppression is achieved by introducing a feedback loop 312 to enhance, received pulses (not shown) in TR doublets (i.e., reference "Ref" and data pulses "Tr" encompassed within received signal r(t)), such as, but not limited to, Radio Frequency (RF) pulse doublets. Feedback loop 312 is more often designed to have an averaging delay, denoted by the letter T, equal to a symbol repetition period (SRP), and a feedback loop 312 loss factor α having a reduction factor of less than 1.

As illustrated in FIG. 3, an upper arm signal 314 is first circulated in feedback loop 312 and back to an adder 313 instead of feeding directly through to a multiplier 316 input, then through a finite integrator 318 and finally to a decision block 320, wherein $T_{in}$, of finite integrator 318 denotes a predetermined finite integration period of overlapped "Ref" and "Tr" pulses. A portion of received signal (r)t is split off of a common input line 322 and directed to a delay 324, denoted by D, which delays incoming pulse pairs to enable the overlapping of "Ref", i.e., reference pulses, captured in feedback loop 312 and "Tr" pulses encoded with data, where their product as produced by multiplier 316 and integrated by finite integrator 318, decodes the pulse pair by capturing the total energy.

The overlapping of the "Ref" occurs when loop delay T is set to the symbol repetition period (SRP). Since the polarity of "Ref" pulses is always the same, the overlap in each loop iteration makes such pulses gain in amplitude while data pulses "Tr" do not experience the same resonance because of having opposite polarity depending on the transmitted data.

Assuming that interference caused by AWGN is uncorrelated with a desired signal, each circulation of input signal through feedback loop 312 makes "Ref" pulses cleaner, i.e., a greater signal to noise ratio, by rejecting the interference. However, in order to have a successful narrowband interference rejection, the feedback loop delay, T, should not be equal to integer multiplies of interfering narrowband signal period to avoid resonating the NBI.

Figure 4:
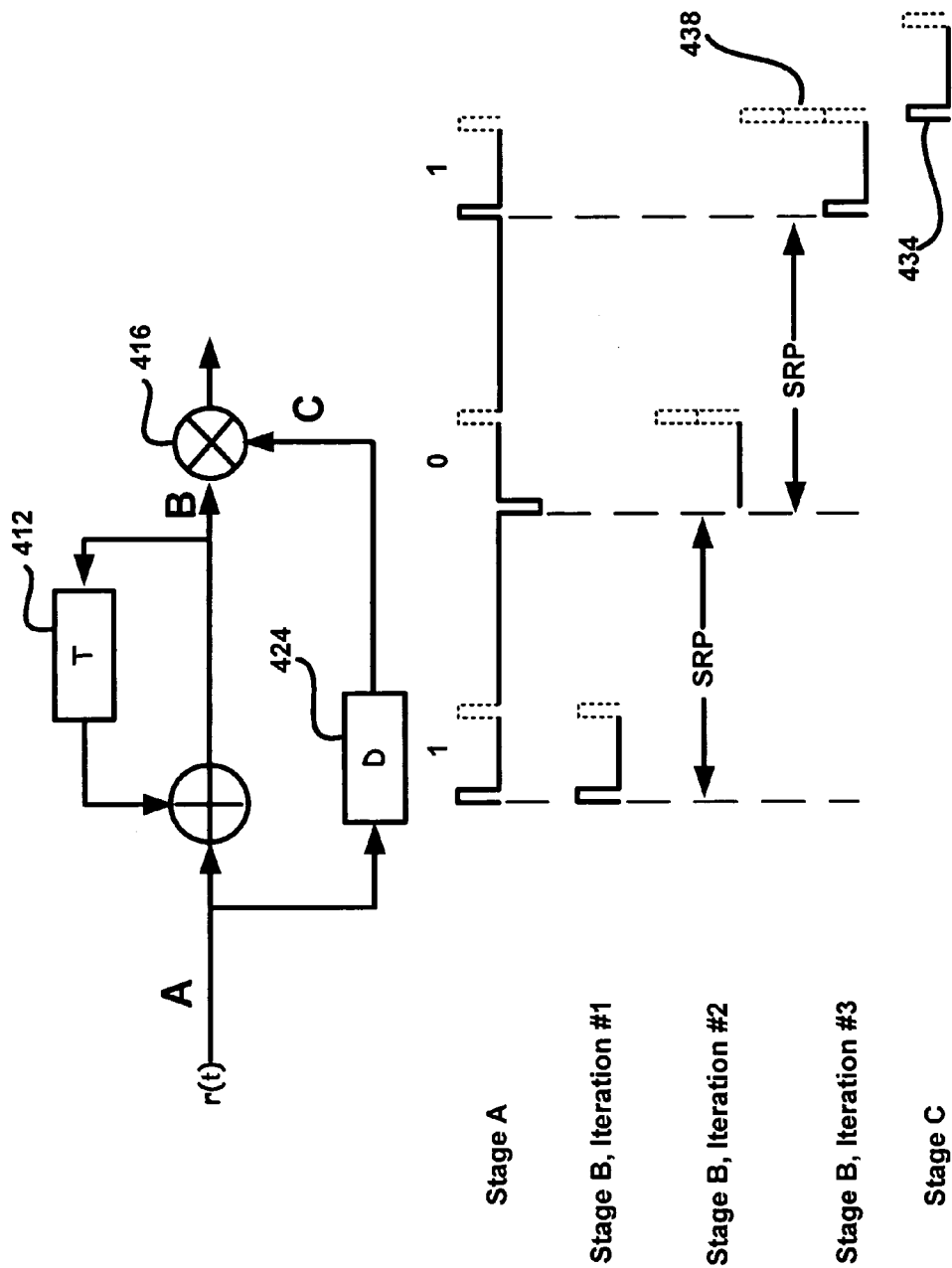
FIG. 4 illustrates a reference pulse "Ref" enhancing example after 3 iterations through an UWB receiver feedback loop.

FIG. 4, illustrates graphically, a reference pulse "Ref" (shown as dashed pulses) increasing in signal after 3 iterations through an UWB receiver feedback loop 412 of the present invention. At stage A, an input signal containing data bits equal to {1,0,1} is represented. At stage B, i.e., iterations 1-3, input pulses, are shifted by a symbol repetition period, denoted as SRP, by feedback loop 412 having an averaging delay T, resulting in a resonance in overlapped "Ref" pulses prior to input to multiplier 416. At stage C, an input symbol is delayed by D, through delay 424 which represents the delay between the pulses in a UWB-TR doublet, and overlaps a data pulse 434 with a strong clean reference pulse 438. It is beneficial that feedback loop 412 amplifier implements a gain of less than one to introduce a loss factor for processing gain of the combined noise and signal associated with loop iterations. Such adjustment of the gain results in noise signals circulating in the loop along with the desired signals to incur an increment of loss. This loss is often adjusted to the maximum value while assuring loop stability. The lower the loop loss the longer would the loop retain a pulse, hence the larger number of pulses that are averaged.

FIG. 5(a) and FIG. 5(b) show "Ref" pulse cleaning in a transmission channel that includes AWGN and NBI. Specifically FIG. 5(a) shows a plot of an UWB TR doublet, i.e., a reference "Ref" pulse 502 and an encoded data "Tr" pulse 506, in the presence of a strong interference 504. FIG. 5(b) shows a cleaned "Ref" pulse 508 after 100 loop iterations in the presence of reduced interference 510 having a loop gain of α=0.95. FIG. 5(b) also illustrates "Tr" pulse 512 not exhibiting resonance after the same number of loop iterations as "Ref" pulse 508.

Accordingly, as illustrated in FIG. 5(a) and FIG. 5(b), the signal-to-interference ratio of "Ref" pulses increase significantly as the number of loop iterations increases. Such a method is beneficial for signals corrupted by AWGN channels, since different samples of white noise are uncorrelated, although the feedback loop filter often can introduce some correlation. Further, for a successful NBI rejection, averaging delay T cannot be equal to integer multiples of interfering narrowband signal period to avoid resonating the NBI.

Figure 6:
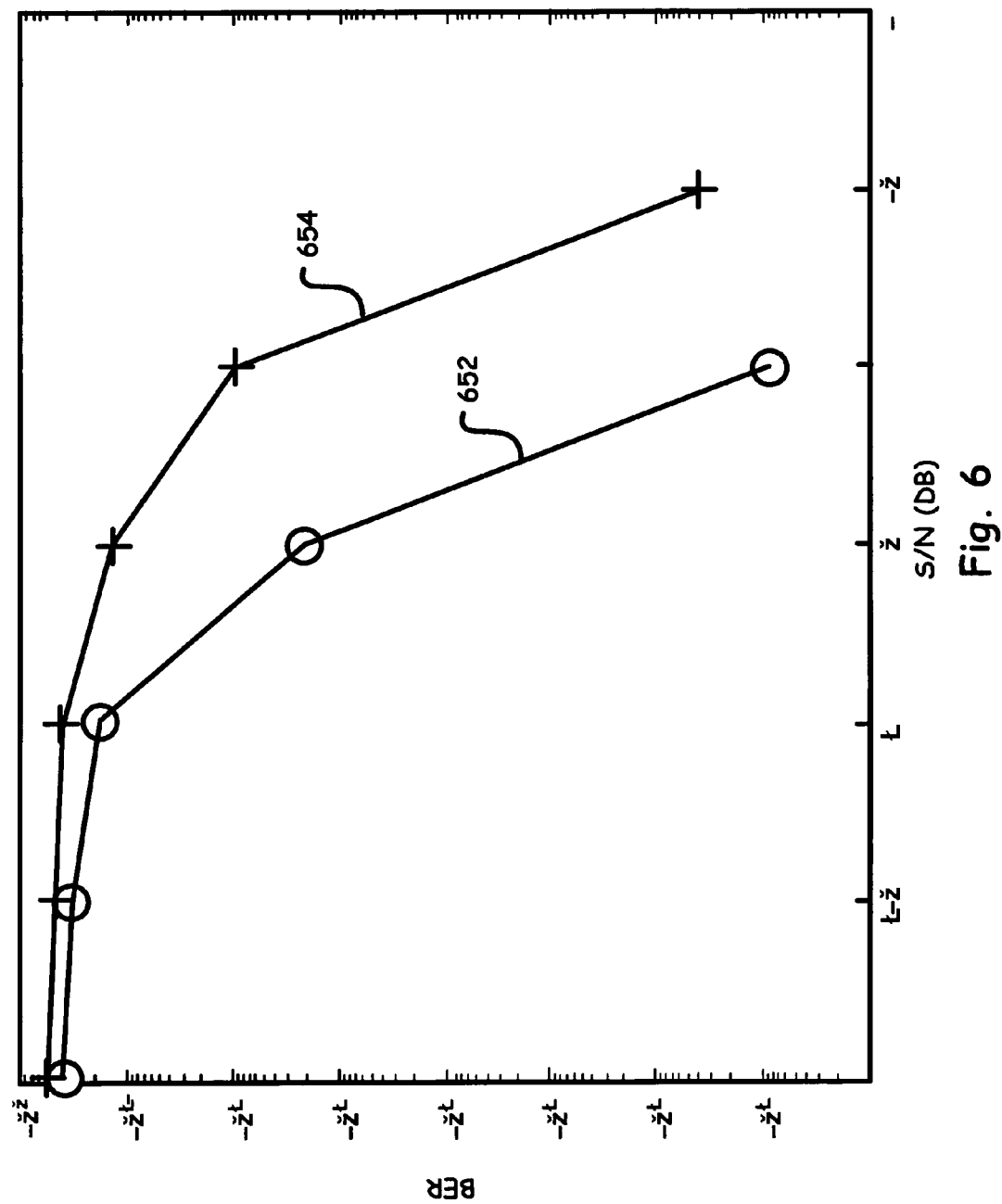
FIG. 6 illustrates a comparison of Bit Error Rate (BER) performance improvement for a TR receiver having a feedback loop mechanism and a conventional TR receiver.

FIG. 6 illustrates a comparison of BER performance improvement for a TR receiver of the present invention, as shown in FIG. 3 having a feedback loop mechanism 652 (shown as circled symbols) and a conventional TR receiver 654 (shown as plus symbols) in a combined AWGN/NBI transmission channel.

Figure 7:
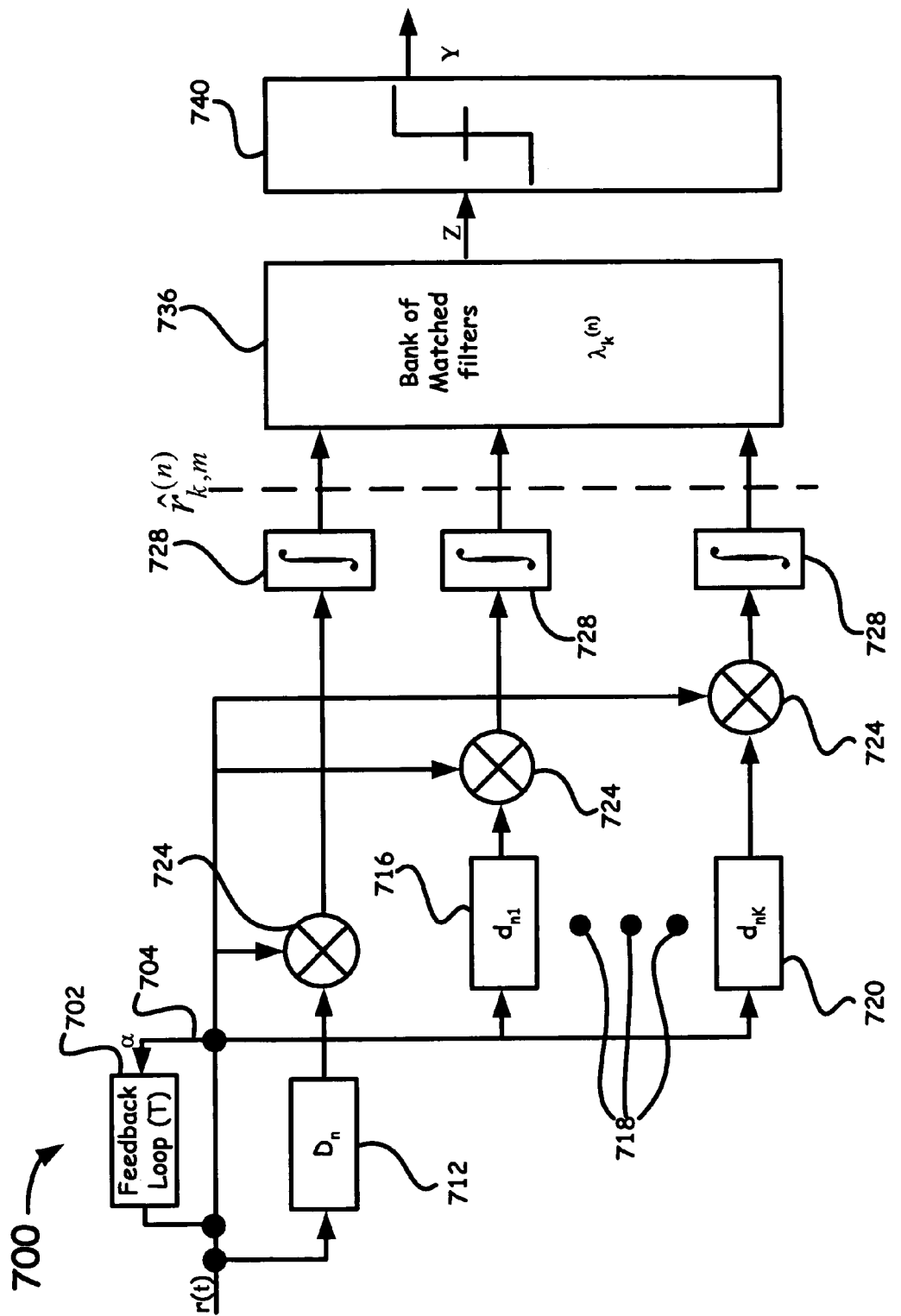
FIG. 7 shows a receiver embodiment utilizing a multipass multiple delay arrangement (MPMD) coupled with a feedback loop.

FIG. 7 shows another example receiver embodiment of the present invention, generally designated as reference numeral 700, utilizing a multi-pass multiple delay arrangement MPMD coupled with a feedback loop 702 having an averaging delay T and a gain α of less than 1. As shown in FIG. 7, receiver 700 includes a user's delay, i.e., a main delay ($D_n$) 712, which represents the delay between "Ref" and "Data" pulses in TR doublets for each user, and a plurality of offset delays or lags ($d_{nk}$), 716, 718, 720, of the original received signal, denoted as r(t). An upper arm signal 704 is first circulated in feedback loop 702 instead of feeding through directly to a multiplier 724 input. By utilizing multiple delayed versions of received signal r(t) and multiplying and integrating by a plurality of multiplier 724 and integrating circuits 728 respectively with iterated "Ref" and "Data" pulses through feedback loop 702, sampling of received signal's r(t) second order statistical shape, such as, for example, over an autocorrelation shape (and not on the signal shape), can be performed at multiple times. Such a technique decreases multiple access interference (MAI), increases channelization while simultaneously suppressing undesired AWGN and NBI through the feedback mechanism to further improve system BER performance.

As disclosed in incorporated by reference U.S. application Ser. No. 60/462507, output signals from integrators 728 are matched by a bank of matched filters 36 to sampled values of autocorrelation functions (ACFs) of the original transmitted pulses. The matched signals are then output, as denoted by the letter Z, to a hard decision block 40 that can output a signal Y indicative of the original encoded transmitted information.

Such an example embodiment, as shown in FIG. 7, more often includes chirp pulses (i.e., a frequency modulated signal) with different start and end frequencies with each user having its own unique pulse shape. Chirp pulses that do not overlap in frequency band and are theoretically uncorrelated with each other (i.e., are orthogonal) can be separated using MPMD techniques. However, other pulse formats, capable of providing uncorrelated pulse shapes, known by those skilled in the art, which are suitable for UWB communications can additionally be employed within the design parameters of the present invention, such as, but not limited to, Hermite function based orthogonal pulses and wavelet waveforms.

A typical UWB pulse can experience significant degradations in dense multi-path channels but the shape of its second order statistical function, e.g., the autocorrelation function (ACF), is relatively preserved at the receiver. Therefore, multi-sampling the shape of the second order statistical function by MPMD receiver 700 provides significant improvements to the detection process of multiple pulse systems. As another arrangement, matched filters 736 can store cross-correlation functions of received signal r(t), instead of stored ACFs of the original transmitted pulse(s), and match these stored cross-correlation functions to cross-correlation functions produced by similar circuitry of the present invention. The matched signals are then output, as denoted by the letter Z, to a hard decision block 40 that can output a signal Y indicative of the original encoded transmitted information.

In a beneficial example method embodiment of the invention, receiver 700 can be arranged to iterate through a feedback loop, predetermined "Ref" and "Tr" pulses to suppress noise, such as, NBI and AWGN, and in addition, multi-sample a second order statistical function, such as, an ACF of each user's pulse at both the zero and non-zero lags (i.e., ACF side lobes) and match them to corresponding samples taken from known transmitted ACF pulse-shapes rather than sampling and matching signal pulse shapes. Such an example receiver 700 employs an autocorrelation technique by using multiple delayed versions of the received signal. It is significant to note that $D_n$ and $d_{nk}$ are unique for each receiver channel, i.e., each user. Then, matched filters 736 matched to ACF samples, denoted as $\lambda_k^{(n)}$ in FIG. 7, of transmitted pulses for each user followed by hard decision block 740 separates the channels. The output of receiver 700, as denoted by the letter Y in FIG. 7, is given by:

$$Y = (\text{sgn}(\lambda_k^{(n)} \cdot \hat{r}_{k,m}^{(n)}))$$

Here, the dot product represents matched filtering, n=1, 2, . . . , N (# of users), k=1, 2, . . . , K (# of lags), m=1, 2, . . . , M (# of bits), and where, $$\lambda_k^{(n)} = [R_{P_n P_n}^{(n)}(1) \ldots R_{P_n P_n}^{(n)}(K)]; \text{ and}$$

$$\hat{r}_{k,m}^{(n)} = \begin{bmatrix} \hat{r}_{1,1}^{(n)} & \cdots & \hat{r}_{1,m}^{(n)} \\ \vdots & \ddots & \vdots \\ \hat{r}_{k,1}^{(n)} & \cdots & \hat{r}_{k,m}^{(n)} \end{bmatrix};$$

wherein $\lambda_k^{(n)}$ denotes a vector of K sampled values of the $n^{th}$ user's transmitted pulses' normalized autocorrelation function. For example, $$R_{P_n P_n}^{(n)}(1)$$

(1) represents the first sampling point (lag=0) of the normalized ACF for the $n^{th}$ user's transmitted pulse. Similarly, $$\hat{r}_{k,m}^{(n)},$$

shown as the output of integrators 728 in FIG. 7, provides the sampled ACF matrix of the $n^{th}$ user's $m^{th}$ bit for k lags at the receiver. Each row of the $$\hat{r}_{k,m}^{(n)}$$

matrix represents the correlation between the received signal and its delayed version based on various delays as shown by the following equation:

$$\hat{r}_{k,m}^{(n)} = \int_{(m-1)T}^{(m-1)T+T_{in}} r(t) \cdot r(t - \Delta_n) \, dt;$$

where $T_{in}$ is the integration time that is most effective at a pulse width and $\Delta_n$ is the total delay given by:

$$\Delta_n = D_n + d_{nk}.$$

As shown by the equation for $\Delta_n$, $D_n$ represents the $n^{th}$ user's main delay representing lag zero in the ACF and $d_{nk}$ denotes the offset from its main delay or lag k in the ACF and its value is zero for k=1 ($d_{n1}$=0).

Therefore, delaying the received signal by $D_n$ causes a "Ref" pulse to align with a "Tr" pulse in each pulse pair where their product decodes the pulse pair by capturing the energy in lag zero of the generated ACF. Integrating this product over a finite time samples the ACF at lag zero. Further delaying the received signal by multiple offsets $d_{nk}$, which is added to the main delay $D_n$ and multiplying with its undelayed version, samples the ACF in non-zero lags after integration. The sampled points are estimates of the received signal's ACF. These values ($\hat{r}_{k,m}^{(n)}$) are then matched to the original pulses' sampled ACF values ($\lambda_k^{(n)}$) and provide a more accurate decoding of the received symbols.

It should be understood that the invention is not intended to be limited to the particular forms disclosed. Rather, the invention is to cover all modifications, equivalents, and alternatives falling within the spirit and scope of the invention as defined by the following appended claims.

The invention claimed is:

1. An ultra-wideband (UWB) communication receiver, comprising:
    a feedback amplifier having an input line and an output line, said input line electrically coupled to a common input line, wherein said feedback amplifier, said input line and said output line are configured as a feedback loop so as to loop at least once one or more transmitted pulse pairs received on said common input line, wherein said transmitted pulse pairs have a predetermined encoded data and a predetermined symbol repetition rate;
    a primary delay electrically coupled to said common input line and configured to reproduce a predetermined primary lag interval $D_n$ of said one or more transmitted pulse pairs;
    one or more secondary delays electrically coupled to said common input line and configured to produce one or more non-zero lag intervals $d_{nk}$ of said received pulse pairs,
        a plurality of pulse multipliers and finite integrators designed to generate a plurality of data values indicative of a second order statistical function of said received pulse pairs resulting from said primary delay and from said one or more secondary delays, a bank of filters to match a plurality of stored sampled values indicative of a second order statistical function of said one or more transmitted pulse pairs with said generated values indicative of a second order statistical function resulting from said primary and said one or more secondary delays of said received pulse pairs; and a hard decision block designed to produce one or more output bits based on matching said sampled values indicative of said second order statistical function and said generated values indicative of said second order statistical function of said received pulse pairs that indicates encoded information of said transmitted pulse pairs.

2. The receiver of claim 1, wherein a gain of said feedback loop is less than 1.

3. The receiver of claim 1, wherein said feedback loop averages out interfering narrowband signals and white noise by adjusting a feedback loop travel time delay to substantially match said predetermined symbol repetition rate of said received pulse pairs.

4. The receiver of claim 1, wherein said encoding includes a relative polarity of a received transmitted data pulse with respect to a received transmitted reference pulse.

5. The receiver of claim 1, wherein said second order statistical function of said received pulse pairs includes an autocorrelation function.

6. The receiver of claim 1, wherein said second order statistical function of said received pulse pairs includes a cross-correlation function.

7. The receiver of claim 1, wherein said encoded data includes orthogonal pulses.

8. The receiver of claim 7, wherein said orthogonal pulses include a chirp waveform.

9. The receiver of claim 8, wherein said chirp waveform is different for a plurality of users.

10. The receiver of claim 9, wherein said chirp waveform increases channel capacity and decreases multiple access interference.

11. The receiver of claim 7, wherein said orthogonal pulses include a Hermite waveform.

12. The receiver of claim 7, wherein said orthogonal pulses include a wavelet waveform.

13. The receiver of claim 1, wherein said lag interval $d_{nK}$ includes a temporal delay that can be down to about a picosecond.

14. An ultra-wideband (UWB) system, comprising:
a transmitter capable of generating one or more pulse pairs having a predetermined encoded data, a predetermined symbol repetition rate, and a primary lag interval $D_n$;
a receiver, further comprising,
a feedback amplifier having an input line and an output line, said input line electrically coupled to a common input line, wherein said feedback amplifier, said input line and said output line are configured as a feedback loop so as to loop at least once, one or more transmitted pulse pairs received on said common input line;
a delay electrically coupled to said common input line and configured to reproduce said primary lag interval $D_n$ of said received one or more transmitted pulse pairs;
one or more secondary delays electrically coupled to said common input line and configured to produce one or more non-zero lag intervals $d_{nk}$ of said received pulses,
a plurality of pulse multipliers and finite integrators designed to generate a plurality of data values indicative of an autocorrelation function of said received pulse pairs resulting from said primary delay and from said one or more secondary delays, a bank of filters to match a plurality of stored sampled values indicative of an autocorrelation function of said one or more transmitted pulse pairs with said generated values indicative of an autocorrelation function resulting from said primary and said one or more secondary delays of said received pulse pairs; and a hard decision block designed to produce one or more output bits based on matching said stored sampled values indicative of an autocorrelation function and said generated values indicative of an autocorrelation function of said received pulse pairs that indicates encoded information of said transmitted pulse pairs.

15. The receiver of claim 14, wherein a gain of said feedback loop is less than 1.

16. The receiver of claim 14, wherein said feedback loop averages out interfering narrowband signals and white noise by adjusting a feedback loop travel time to substantially match said predetermined symbol repetition rate of said received pulse pairs.

17. The receiver of claim 14, wherein said encoding includes a relative polarity of a received transmitted data pulse with respect to a received transmitted reference pulse.

18. The receiver of claim 14, wherein said encoding includes a relative polarity of a received transmitted data pulse with respect to a received transmitted reference pulse.

19. The receiver of claim 14, where said second order statistical values are capable of being produced by an autocorrelation function.

20. The receiver of claim 14, wherein said encoded pulses includes orthogonal pulses.

21. The receiver of claim 20, wherein said orthogonal pulses include a chirp waveform.

22. The receiver of claim 21, wherein said chirp waveform is different for a plurality of users.

23. The receiver of claim 22, wherein said chirp waveform increases channel capacity and decreases MAI.

24. The receiver of claim 20, wherein said orthogonal pulses include a Hermite waveform.

25. The receiver of claim 20, wherein said orthogonal pulses include a wavelet waveform.

26. The receiver of claim 14, wherein said lag interval $d_{nK}$ includes a temporal delay that can be down to about a picosecond.

27. An ultra-wideband (UWB) receiver method, comprising:
receiving one or more UWB transmitted pulse pairs, each of said transmitted pulse pairs separated by a predetermined lag interval D, wherein one or more received pulse pairs have a predetermined encoded data and a predetermined symbol repetition rate;
feedback looping one or more times, a predetermined portion of said one or more received UWB pulse pairs, wherein said pulse pairs are shifted by said symbol repetition period with each iteration through a feedback loop;
delaying a predetermined portion of said received one or more UWB pulse pairs, by said lag interval D;
multiplying and integrating one or more reference signals produced by said looped pulse pairs with one or more delayed versions of encoded data comprised in said delayed one or more pulse pairs to generate a total energy that decodes said one or more received pulse pairs; and
outputting bit information indicative of encoded information of said received pulse pairs.

28. The method of claim 27, wherein a gain of said feedback loop is less than 1.

29. The method of 27, wherein said feedback loop averages out interfering narrowband signals and white noise by adjusting a feedback loop travel time to substantially match said predetermined repetition rate of said received pulse pairs.

30. The method of 27, wherein said encoding includes a relative polarity of a received transmitted data pulse with respect to a received transmitted reference pulse.

31. An ultra-wideband (UWB) method, comprising:
receiving one or more UWB transmitted pulse pairs, each of said transmitted pulse pairs separated by a predetermined primary lag interval $D_n$, wherein one or more received pulse pairs have a predetermined encoded data and a predetermined symbol repetition rate;
feedback looping one or more times, a predetermined portion of said one or more received UWB pulse pairs, wherein said received one or more pulse pairs are shifted by said symbol repetition period with each iteration through a feedback loop;
delaying a predetermined portion of said received one or more UWB pulse pairs, by said primary lag interval $D_n$;
multiplying and function of said received pulse pairs;
matching a integrating said primary and secondary delayed pulses with a predetermined looped received reference pulse to generate a plurality of values indicative of the autocorrelation plurality of stored sampled values indicative of the autocorrelation function of said transmitted pulse pairs with said generated plurality of values indicative of the autocorrelation function of said received pulse pairs; and
outputting bit information based on said matched sampled values indicative of the autocorrelation function of said transmitted pulse pairs that indicates encoded information of said transmitted pulse pairs.

32. The method of claim 31, wherein a gain of said feedback loop is less than 1.

33. The method of 31, wherein said feedback loop averages out interfering narrowband signals and white noise by adjusting a feedback loop travel time to substantially match said predetermined repetition rate of said received pulse pairs; the method of 27, wherein said encoding includes a relative polarity of a received transmitted data pulse with respect to a received transmitted reference pulse.

34. The method of claim 31, wherein said received pulses include orthogonal pulses.

35. The method of claim 34, wherein said orthogonal pulses include a chirp waveform.

36. The method of claim 35, wherein said chirp waveform is different for a plurality of users.

37. The method of claim 36, wherein said chirp waveform increases channel capacity and decreases MAI.

38. The method of claim 34, wherein said orthogonal pulses include a Hermite waveform.

39. The method of claim 34, wherein said orthogonal pulses include a wavelet waveform.

* * * * *